(12) United States Patent
Maurer et al.

(10) Patent No.: US 9,103,389 B2
(45) Date of Patent: Aug. 11, 2015

(54) TRANSMISSION BRAKE HUB

(71) Applicant: FORD GLOBAL TECHNOLOGIES, LLC, Dearborn, MI (US)

(72) Inventors: Jeffrey E. Maurer, Commerce, MI (US); Gregory D. Goleski, Rochester Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 40 days.

(21) Appl. No.: 13/659,057

(22) Filed: Oct. 24, 2012

(65) Prior Publication Data

US 2014/0113763 A1 Apr. 24, 2014

(51) Int. Cl.
*F16D 55/40* (2006.01)
*F16D 25/06* (2006.01)

(52) U.S. Cl.
CPC ............. *F16D 25/06* (2013.01); *F16D 55/40* (2013.01)

(58) Field of Classification Search
CPC .......... F16D 55/36; F16D 55/40; F16D 55/44
See application file for complete search history.

(56) References Cited

U.S. PATENT DOCUMENTS

| | | | | |
|---|---|---|---|---|
| 4,205,563 | A | * | 6/1980 | Gorrell ........................... 475/59 |
| 5,462,147 | A | * | 10/1995 | Sherman ..................... 192/18 A |
| 2003/0224899 | A1 | * | 12/2003 | Ishimaru et al. .............. 475/275 |
| 2014/0087910 | A1 | * | 3/2014 | Thomas et al. ............... 475/269 |

* cited by examiner

*Primary Examiner* — Huan Le

(74) *Attorney, Agent, or Firm* — James Dottavio; MacMillan, Sobanski & Todd, LLC

(57) ABSTRACT

A brake assembly includes first and second brakes, a gearset including first and second members, a hub held against rotation, the first brake selectively producing a connection between the hub and the first member, the second brake selectively producing a connection between the hub and the second member, and a support secured to a transmission case and the hub, the support formed with brake-apply circuits, each circuit corresponding to one of the brakes.

17 Claims, 3 Drawing Sheets

TRANSMISSION BRAKE HUB

BACKGROUND OF THE INVENTION

1. Field of the Invention

This invention relates generally to an automatic transmission brake hub that reduces hydraulic drag due to open-brake rotation and eliminates transmission case splines.

2. Description of the Prior Art

In a hydraulically-actuated automatic transmission for a motor vehicle, transmission brakes produce high drag losses, which adversely affect fuel economy.

When the brake's separator plates are splined directly to the transmission case, automatic transmission fluid in the case is difficult to evacuate, which leads to high drag. When the brake's separator plates are splined directly to the transmission case, installation of the separator plates and friction plates must be completed as a final assembly, instead of as a subassembly, which is preferred.

Forming spine teeth in the transmission case that engage spline teeth on the brake's separator plates can be costly to machine and produces excessive, unwanted scrap.

SUMMARY OF THE INVENTION

A brake assembly includes first and second brakes, a gearset including first and second members, a hub held against rotation, the first brake selectively producing a connection between the hub and the first member, the second brake selectively producing a connection between the hub and the second member, and a support secured to a transmission case and the hub, the support formed with brake-apply circuits, each circuit corresponding to one of the brakes.

This brake hub eliminates machining of spline teeth in the transmission case and reduces hydraulic drag due to open-clutch rotation.

Cutouts in the hub allow for the brake piston to pass through the cutouts and are also large enough for the assembler to see the brake splines while installing the clutch pack.

The brake hub is tabbed to the pump support instead of the case to prevent rotation, thereby allowing for the rotating brake cylinder to be outside of the clutch pack and providing a large clearance for exhausting oil from the clutch pack. Oil can be quickly exhausted from the open clutch pack, reducing drag loss.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
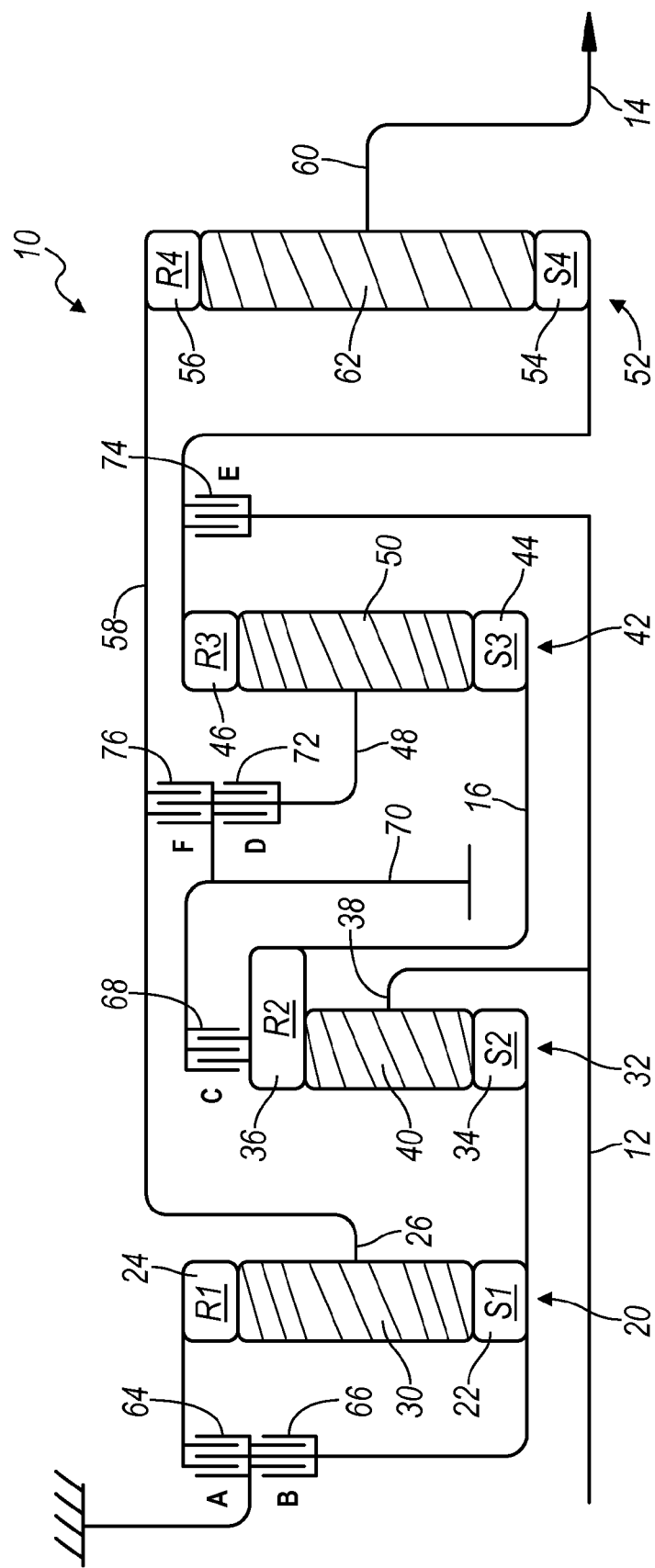
FIG. 1 is a schematic diagram showing a side view of the kinematic assembly for an automatic transmission for a motor vehicle.

The assembly 10 FIG. 1 includes an input 12; output 14; intermediate shaft 16; a first planetary gear set 20 having a first sun gear 22, a first ring gear 24, a first carrier 26; and a set of planet pinions 30 supported on carrier 26 and in continuous meshing engagement with the sun gear 22 and the ring gear 24.

A second planetary gear set 32 includes a second sun gear 34 fixedly coupled to sun gear 22; a second ring gear 36; a second carrier 38 fixedly coupled to the input 12; and a set of planet pinions 40 in supported on carrier 38 and in continuous meshing engagement with sun gear 34 and ring gear 36.

A third planetary gear set 42 includes a third sun gear 44 fixedly coupled to ring gear 36; a third ring gear 46; a third carrier 48; and a set of planet pinions 50 supported on carrier 48 and in continuous meshing engagement with sun gear 44 and ring gear 46.

A fourth planetary gear set 52 includes a fourth sun gear 54 fixedly coupled to ring gear 46; a fourth ring gear 56 fixedly coupled by a shell 58 to carrier 26; a fourth carrier 60 fixedly coupled to output 14; and a set of planet gears 62 supported on carrier 60 and in continuous meshing engagement with sun gear 54 and ring gear 56.

A first brake 64 selectively holds ring gear 24 against rotation.

A second brake 66 selectively holds sun gears 22, 34 against rotation on the transmission case 124.

A first clutch 68 selectively couples ring gear 36 to a clutch housing 70 rotation also on the transmission case 124.

A second clutch 72 selectively couples carrier 48 to clutch housing 70.

A third clutch 74 selectively couples ring gear 46 and sun gear 54 to input 12.

A fourth clutch 76 selectively couples shell 58 to clutch housing 70.

Figure 2:
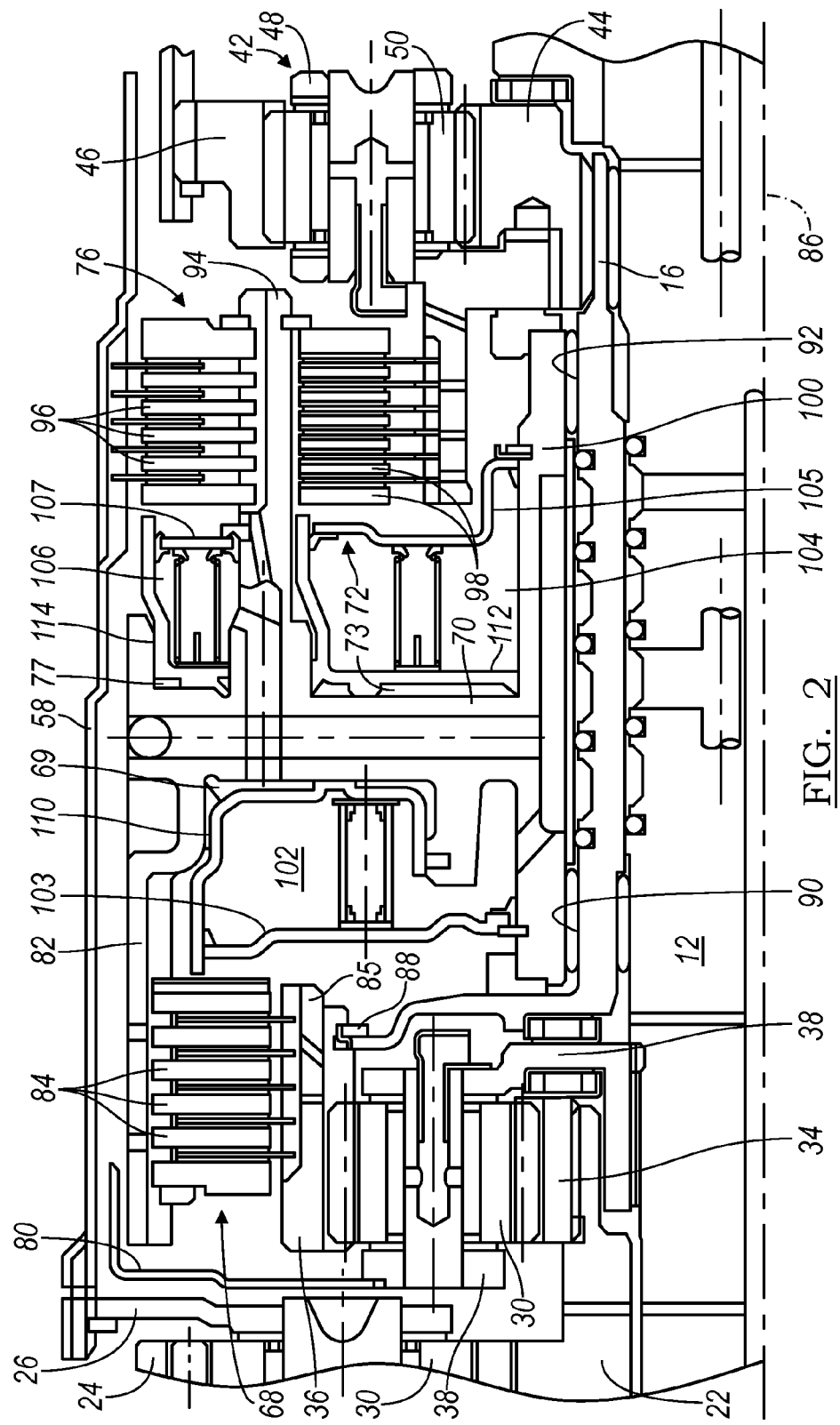
FIG. 2 is a cross section of the kinematic assembly of FIG. 1.

FIG. 2 shows that carrier 38 is secured to drum shell 58.

Clutch housing 70 includes an axial arm 82 formed with internal spine teeth, to which external teeth on the spacer plates 84 of clutch 68 are fixed for rotation with clutch housing 70. The friction plates of clutch 68 are splined to external spline teeth formed on a ring 85, which is formed with ring gear 36.

Intermediate shaft 16, which extends along axis 86 on the radial outer side of input 12, is secured to ring 85 where a snap ring 88 completes the connection. Clutch housing 70 is supported by axially spaced bushings 90, 92 on the radial outer surface of intermediate shaft 16.

Clutch housing 70 includes another axial arm 94 formed with external spine teeth, to which internal teeth on the spacer plates 96 of clutch 76 are fixed for rotation with clutch housing 70. The friction plates of clutch 76 are splined to internal spline teeth formed on a shell 58.

External teeth on the spacer plates 98 of clutch 72 engage internal spline teeth formed on arm 94 of the clutch housing 70. The friction plates of clutch 72 are splined to external spline teeth formed on carrier 48.

Located between bushings 90, 92 and formed in the hub 100 of clutch housing 70 are four feed circuits. A single balance oil feed supplies automatic transmission fluid (ATF) to the pressure balance volumes 102, 104, 106 of clutches 68, 72, 76. Balance dams 103, 105, 107 seal the pressure balance volumes 102, 104, 106 at the pistons 110, 112, 114 of the clutches 68, 72, 76.

Each of the servo cylinders 69, 73, 77 of clutches 68, 72, 76 is supplied with actuating pressure through individual circuits formed in the clutch housing 70. When no actuating pressure is applied to clutches 68, 72, 76, the clutch housing 70 has no fixed connection to any other component of assembly 10.

Figure 3:
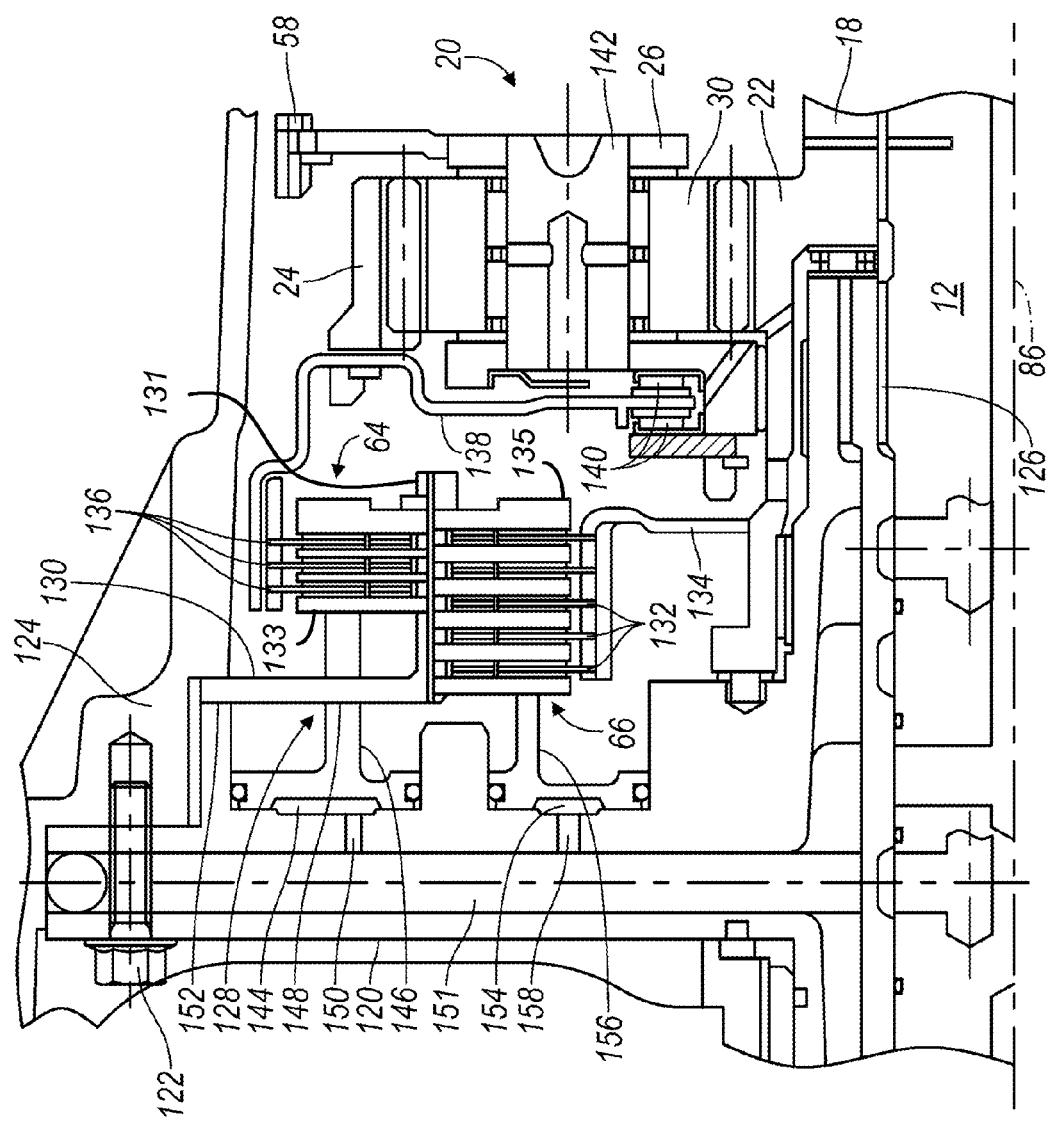
FIG. 3 is a cross section of the kinematic assembly of FIG. 1 showing a brake hub.

FIG. 3 shows a pump support 120 secured by bolts 122 to the transmission case 124 and supporting the input shaft 12 on a bushing 126. A hub 128 for brakes 64, 66 includes a radial arm 130, secured to the pump support, and an axial arm 131 formed with external and internal axial splines, to which the spacer plates 133, 135 of the brakes 64, 66 brake and clutch are secured, respectively.

The friction discs 132 of brake 66 are connected to external, axial spline teeth formed on a disc 134, which is secured to the sun gears 22, 34 through intermediate shaft 18. The friction discs 136 of brake 64 are connected to internal, axial spline teeth formed on a disc 138, which is secured to ring gear 24 and is supported between two thrust bearings 140 located on the carrier 26.

The planet pinions 30 of gearset 20 are supported for rotation on a pinion shaft 142, which is supported on carrier 26.

Pump support 120 is formed with a first cylinder 144 containing a piston 146, which extends though openings 148 into contact with one of the spacer plates of brake 64. Brake-apply pressure is carried through passages 150, 151 to cylinder 144. The openings 148 in hub radial arm 130 allow an assembler of the brake hub assembly to see though the arm while aligning friction plates 136 with disc 138.

Pump support 120 is also formed with a second cylinder 154 containing a piston 156, which contacts one of the spacer plates of brake 66. Brake-apply pressure is carried through passage 158 to second cylinder 154.

The radial arm 130 of the brake hub 128 is secured to the transmission case 124 such that the arm contacts an axial stop 152, which limits axial displacement of the arm and provides an axial reaction force to the force of piston 146 applied to the plates of brake 64 and the force of piston 156 applied to the plates of brake 66.

In accordance with the provisions of the patent statutes, the preferred embodiment has been described. However, it should be noted that the alternate embodiments can be practiced otherwise than as specifically illustrated and described.

The invention claimed is:

1. A brake assembly, comprising:
   first and second brakes;
   a gearset including first and second members;
   a hub held against rotation, the first brake selectively producing a connection between the hub and the first member, the second brake selectively producing a connection between the hub and the second member;
   a support secured to a transmission case and the hub, the support formed with brake-apply circuits, each circuit corresponding to one of the brakes.

2. The brake assembly of claim 1, wherein the hub includes first spline teeth engaged by first plates of the first brake.

3. The brake assembly of claim 1, wherein the first brake further comprises:
   a cylinder located in the support, communicating with one of the brake-apply circuits;
   a piston located in the cylinder and extending through an opening through the hub and into contact with a plate of the first brake.

4. The brake assembly of claim 1, wherein the hub is secured against axial displacement by contact with a surface of the transmission case.

5. The brake assembly of claim 1, wherein the first member is a ring gear of the gearset, and the second member is a sun gear of the gearset.

6. The brake assembly of claim 5, further comprising a disc secured to the first member and engaged by second plates of the first brake.

7. The brake assembly of claim 1, wherein the hub includes second spline teeth engaged by first plates of the second brake.

8. The brake assembly of claim 7, further comprising:
   a second disc secured to the second member and engaged by second plates of the second brake.

9. A brake assembly, comprising:
   first and second brakes, each brake including first and second plates;
   a support held against rotation and formed with brake-apply circuits, each circuit communicating with one of the brakes;
   a hub including a first arm secured to the support, and a second arm engaged with the first plates of the brakes;
   first and second discs, each disc engaged with the first plates of one of the brakes.

10. The brake assembly of claim 9, wherein the second arm includes first spline teeth engaged by the first plates of the first brake.

11. The brake assembly of claim 9, wherein the second arm includes second spline teeth engaged by the first plates of the second brake.

12. The brake assembly of claim 9, wherein the first brake further comprises:
   a cylinder located in the support, communicating with one of the brake-apply circuits; and
   a piston located in the cylinder and extending through an opening through the first arm and into contact with one of the plates of the first brake.

13. The brake assembly of claim 9, wherein the support is secured to a transmission case.

14. The brake assembly of claim 13, wherein the first arm is secured against axial displacement by contact with a surface of the transmission case and a surface of the support.

15. The brake assembly of claim 9, wherein the first disc is engaged with a first gearset member and the second disc is engaged with a second gearset member.

16. The brake assembly of claim 15, wherein the first brake selectively produces a connection between the hub and the first gearset member, the second brake selectively produces a connection between the hub and the second gearset member.

17. The brake assembly of claim 15, wherein the first gearset member is a ring gear, and the second gearset member is a sun gear.

* * * * *